(12) United States Patent
Thomsen

(10) Patent No.: US 11,224,774 B1
(45) Date of Patent: Jan. 18, 2022

(54) CONFIGURABLE SUPPORT FOR AN AUTONOMOUS FIREFIGHTING TOWER

(71) Applicant: Garry D. Thomsen, Mesa, AZ (US)

(72) Inventor: Garry D. Thomsen, Mesa, AZ (US)

( * ) Notice: Subject to any disclaimer, the term of this patent is extended or adjusted under 35 U.S.C. 154(b) by 0 days.

(21) Appl. No.: 17/244,866

(22) Filed: Apr. 29, 2021

(51) Int. Cl.
*A62C 31/28* (2006.01)
*A62C 31/24* (2006.01)
*F16L 3/00* (2006.01)
*F16M 11/00* (2006.01)

(52) U.S. Cl.
CPC .............. *A62C 31/28* (2013.01); *A62C 31/24* (2013.01); *F16L 3/00* (2013.01); *F16M 11/00* (2013.01)

(58) Field of Classification Search
CPC ........ A62C 31/28; A62C 31/24; F16M 11/00; F16L 3/00
USPC ............................................................ 248/75
See application file for complete search history.

(56) References Cited

U.S. PATENT DOCUMENTS

| | | | | |
|---|---|---|---|---|
| 1,329,492 | A * | 2/1920 | Babcock | E04H 17/02 52/153 |
| 2,917,953 | A * | 12/1959 | Badali | B25H 1/0035 254/93 HP |
| 3,030,889 | A * | 4/1962 | Jamesw | B66F 3/24 417/429 |
| 4,691,832 | A * | 9/1987 | Steiger | A47F 5/13 211/181.1 |
| 8,820,421 | B2 | 9/2014 | Rahgozar | |
| 8,905,326 | B2 | 12/2014 | Greenwood et al. | |
| 9,084,907 | B2 | 7/2015 | Kornhaber | |
| 9,163,774 | B2 | 10/2015 | Orlov et al. | |
| 10,065,059 | B2 | 9/2018 | Thomsen | |
| 2002/0020756 | A1 | 2/2002 | Yahav | |
| 2002/0139543 | A1 | 10/2002 | Baughman | |
| 2005/0178565 | A1 | 8/2005 | Voss | |
| 2008/0121309 | A1 * | 5/2008 | Boise | A63H 27/10 141/313 |
| 2012/0042585 | A1 | 2/2012 | Ericsson | |
| 2013/0062080 | A1 | 3/2013 | Tobin et al. | |
| 2013/0206429 | A1 | 8/2013 | Sullivan | |
| 2015/0021054 | A1 | 1/2015 | McNamara et al. | |
| 2015/0231430 | A1 | 8/2015 | Cook | |
| 2016/0051848 | A1 | 2/2016 | Klarlund et al. | |

(Continued)

FOREIGN PATENT DOCUMENTS

CN     202610780 U     12/2012
CN     205042021 U      2/2016
(Continued)

*Primary Examiner* — Muhammad Ijaz

(57) ABSTRACT

A configurable support for an autonomous firefighting tower is mainly used as an unmanned, single leg firefighting tower that extinguishes fires in smaller scale areas. The configurable support includes a support member, a supply pipe, a pipe inlet, and a leg-engagement feature. The support member is the main structure that houses the supply pipe. The supply pipe allows fluid to flow from a water supply and out of the support member. The pipe inlet allows a water supply hose or similar conduit to be hermetically attached to the supply pipe. The leg-engagement feature allows the configurable support to receive an extension leg in order to be situated on a ground surface when the configurable support is combined with the multiple configurable supports to form an unmanned, multiple leg firefighting tower.

13 Claims, 16 Drawing Sheets

(56) References Cited

U.S. PATENT DOCUMENTS

2016/0271434 A1    9/2016  Dusing et al.
2017/0113079 A1*  4/2017  Thomsen ............. A62C 3/0292

FOREIGN PATENT DOCUMENTS

| CN | 208039982 U | 11/2018 |
| CN | 211158318 U | 8/2020 |

* cited by examiner

CONFIGURABLE SUPPORT FOR AN AUTONOMOUS FIREFIGHTING TOWER

FIELD OF THE INVENTION

The present invention relates generally to firefighting equipment and systems. More specifically, the present invention is a configurable support for an autonomous firefighting tower that extinguishes fires in smaller scale areas or can be combined with multiple of the same invention to form a larger unmanned, multiple leg firefighting tower.

BACKGROUND OF THE INVENTION

The autonomous and boom-mounted water cannon apparatus disclosed in U.S. Pat. No. 10,065,059 is used for extinguishing fires in heavy urban regions. This apparatus requires the use of a crane in order to transport the apparatus to large areas to extinguish a fire. For large areas, the related invention is the best option in order to extinguish fires, but there exists a need for an invention that can be transported without the need of a crane and an invention that can be positioned within smaller scale areas.

Thus, the present invention provides a configurable support for an autonomous firefighting tower that extinguishes fires in smaller scale areas or can be combined with multiple of the same invention to form a larger unmanned, multiple leg firefighting tower. The present invention provides many advantages such as rapid deployment, a lighter weight tower, and effectiveness for limited water sources. The present invention can be configured as an unmanned, single leg firefighting tower that allows attachment of a water cannon and a water supply such as a hose or a pipe. In the unmanned, single leg firefighting tower configuration, the present invention can provide a coverage of 75-80 yard with water or foam coverage on a 360-degree arc. The present invention can be combined with multiple of the same invention in order to form an unmanned, multiple leg firefighting tower which would operate similarly to the related invention.

DETAIL DESCRIPTIONS OF THE INVENTION

All illustrations of the drawings are for the purpose of describing selected versions of the present invention and are not intended to limit the scope of the present invention.

In reference to FIGS. 1 through 16, the present invention is a configurable support for an autonomous firefighting tower that is mainly used as an unmanned, single leg firefighting tower that extinguishes fires in smaller scale areas. In the preferred embodiment, the present invention comprises a support member 1, a supply pipe 4, a pipe inlet 7, and a leg-engagement feature 8. The support member 1 is the main structure that houses the supply pipe 4. The supply pipe 4 allows fluid to flow from a water supply and out of the support member 1. The pipe inlet 7 allows a water supply hose or similar conduit to be hermetically attached to the supply pipe 4. The leg-engagement feature 8 allows the present invention to receive an extension leg in order to be situated on a ground surface when multiple of the present invention are arranged together in order to form an unmanned, multiple leg firefighting tower, which is similar to the apparatus disclosed in U.S. patent Ser. No. 10/065,059. Thus, the contents of U.S. patent Ser. No. 10/065,059 in relation to the present invention is incorporated by reference.

Figure 1:
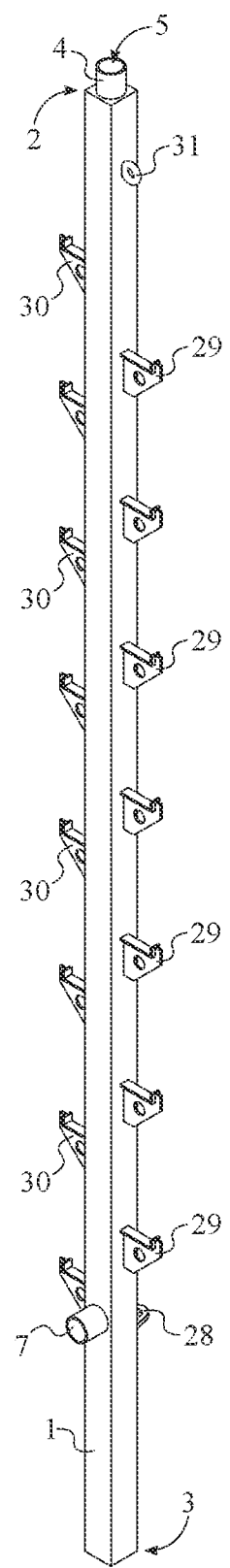
FIG. 1 is a front top perspective view of the present invention.
Figure 2:
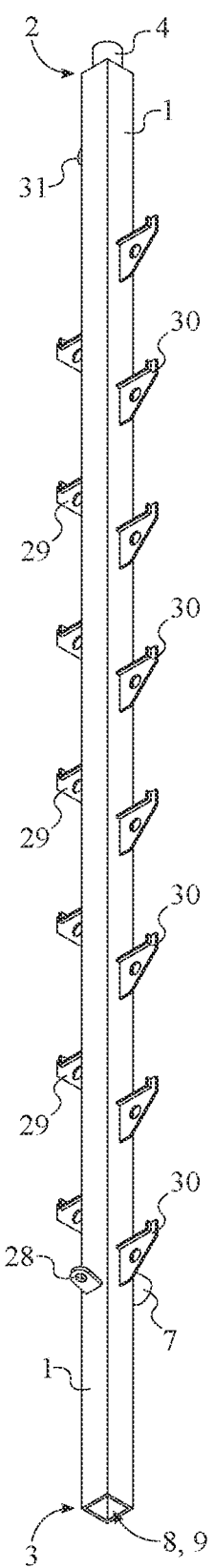
FIG. 2 is a rear bottom perspective view of the present invention.
Figure 3:
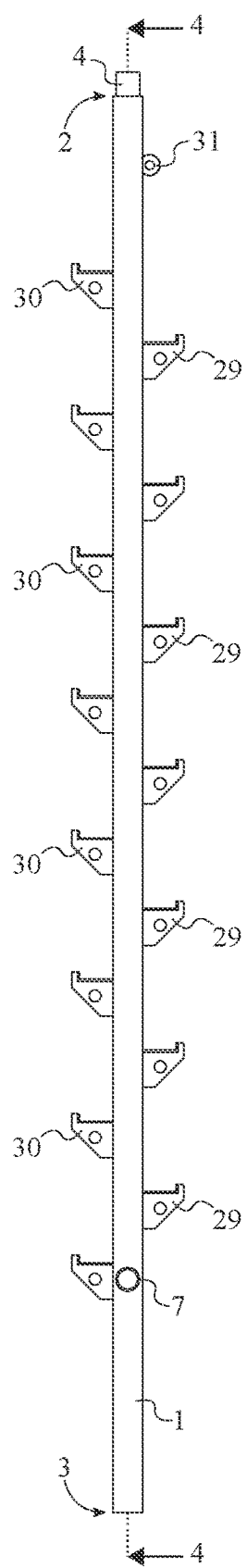
FIG. 3 is a front view of the present invention.
Figure 4:
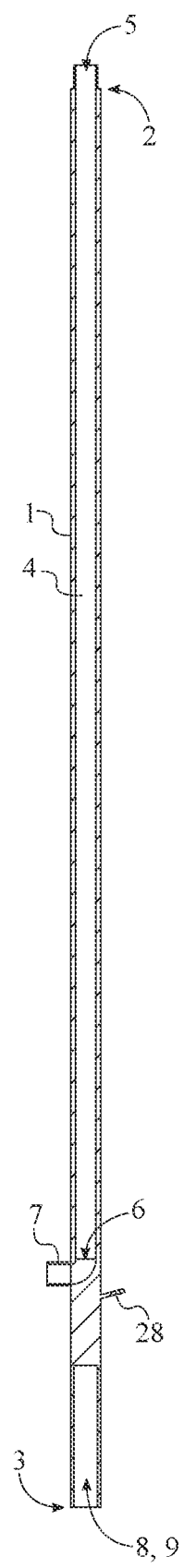
FIG. 4 is a cross sectional view taken along line 4-4 in FIG. 3.

The general configuration of the aforementioned components allows the present invention to extinguish fires in smaller scale areas. With reference to FIGS. 1 and 2, the support member 1 comprises an upper member end 2 and a lower member end 3, and the supply pipe 4 comprises an open pipe end 5 and a closed pipe end 6. The leg-engagement feature 8 is integrated into the support member 1, adjacent to the lower member end 3 in order to easily receive an extension leg. The supply pipe 4 traverses into and along the support member 1, in order to allow fluid to flow into and through the support member 1.

The open pipe end 5 is positioned external to the support member 1, offset the upper member end 2 in order to allow fluid to freely be outputted out of the support member 1. The closed pipe end 6 is positioned within the support member 1, adjacent to the leg-engagement feature 8, in order to conceal and protect the closed pipe end 6. The pipe inlet 7 laterally traverses into the support member 1 and is positioned adjacent to the leg-engagement feature 8, offset from the lower member end 3. Further, the pipe inlet 7 is in fluid communication with the supply pipe 4. This arrangement allows the user to easily attach a water supply hose or similar to the supply pipe 4 through the pipe inlet 7.

Figure 10:
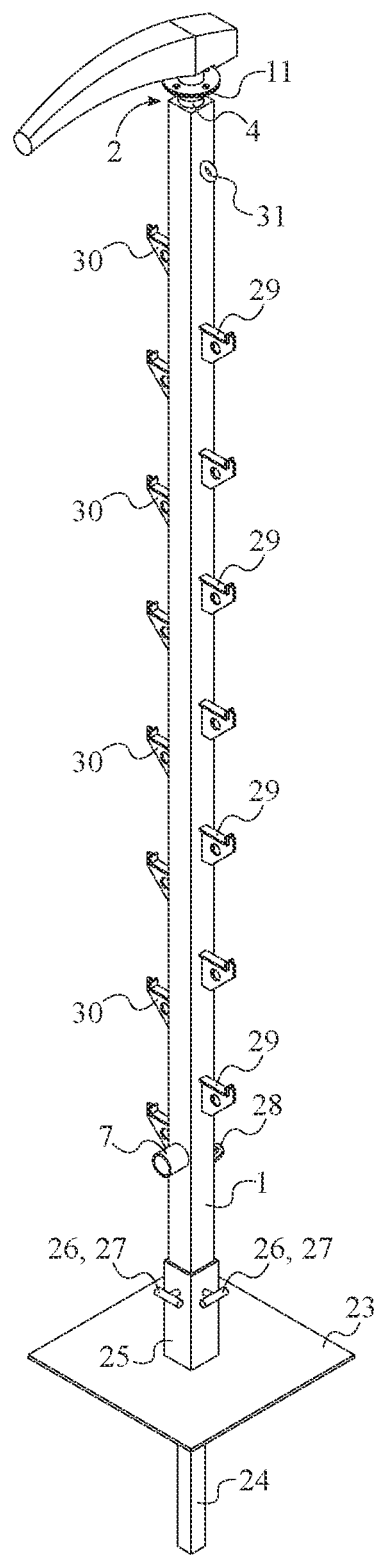
FIG. 10 is a front top perspective view of the present invention configured into an unmanned, single leg firefighting tower displaying a cannon adapter and the means to mount into a ground surface.
Figure 11:
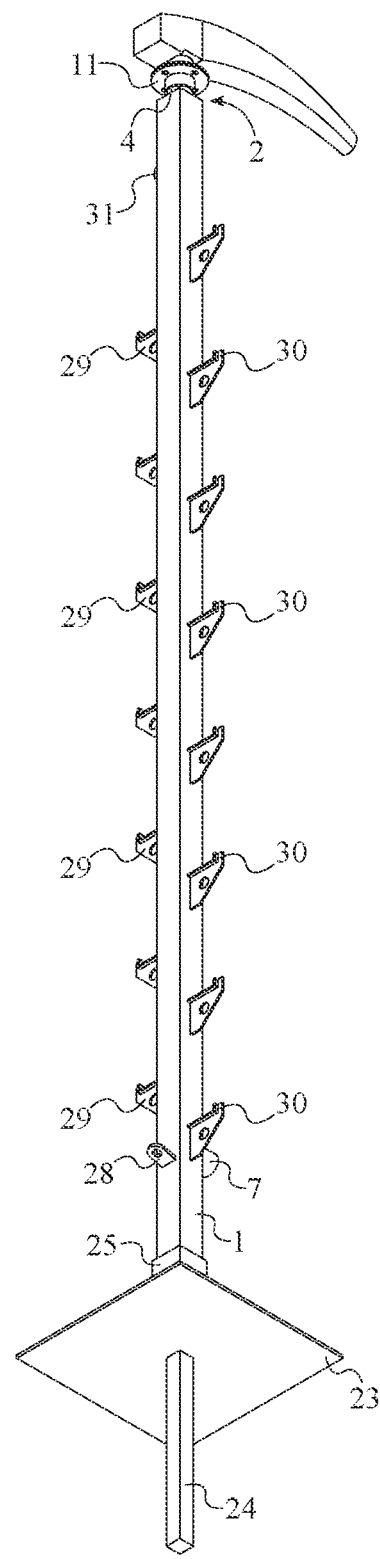
FIG. 11 is a rear bottom perspective view of the present invention configured into the unmanned, single leg firefighting tower displaying the cannon adapter and the means to mount into a ground surface.
Figure 12:
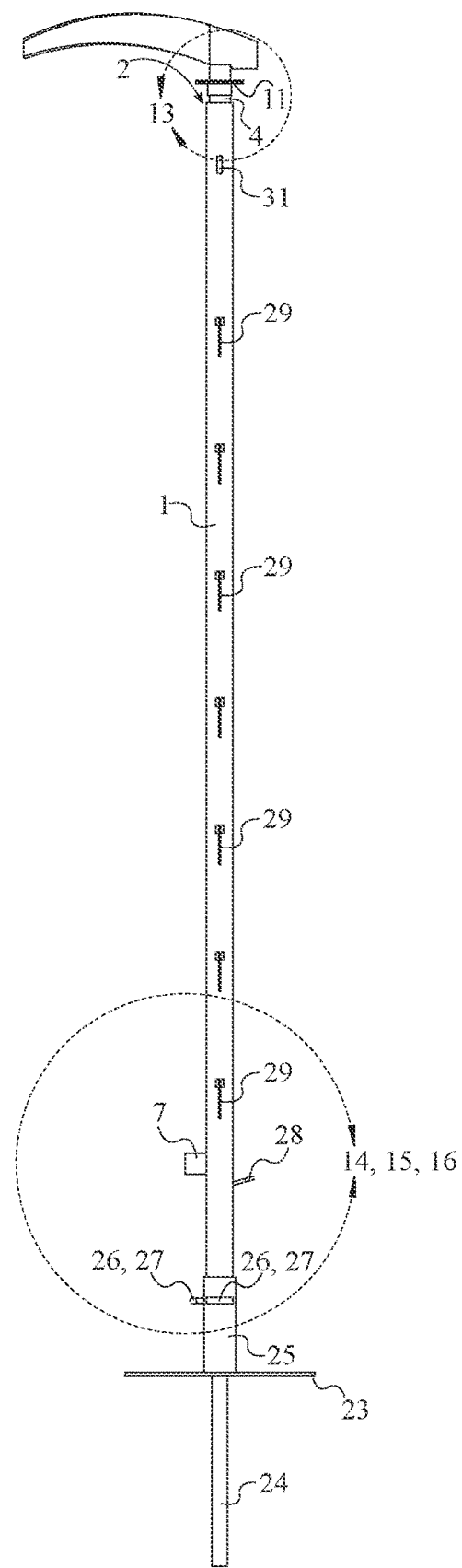
FIG. 12 is a side view of the present invention configured into the unmanned, single leg firefighting tower displaying the cannon adapter and the means to mount into a ground surface.
Figure 13:
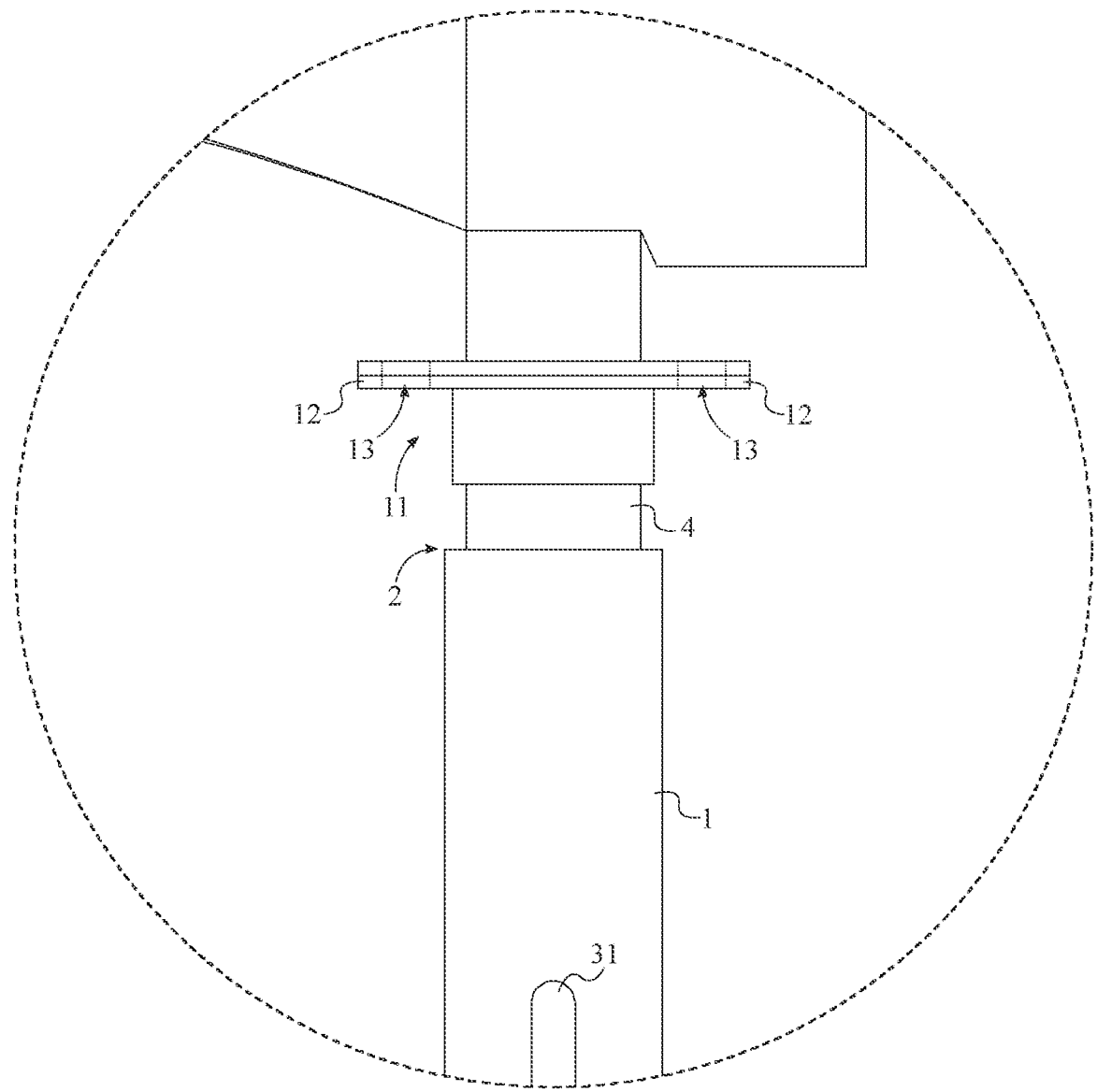
FIG. 13 is a detailed view taken about circle 13 in FIG. 12.
Figure 14:
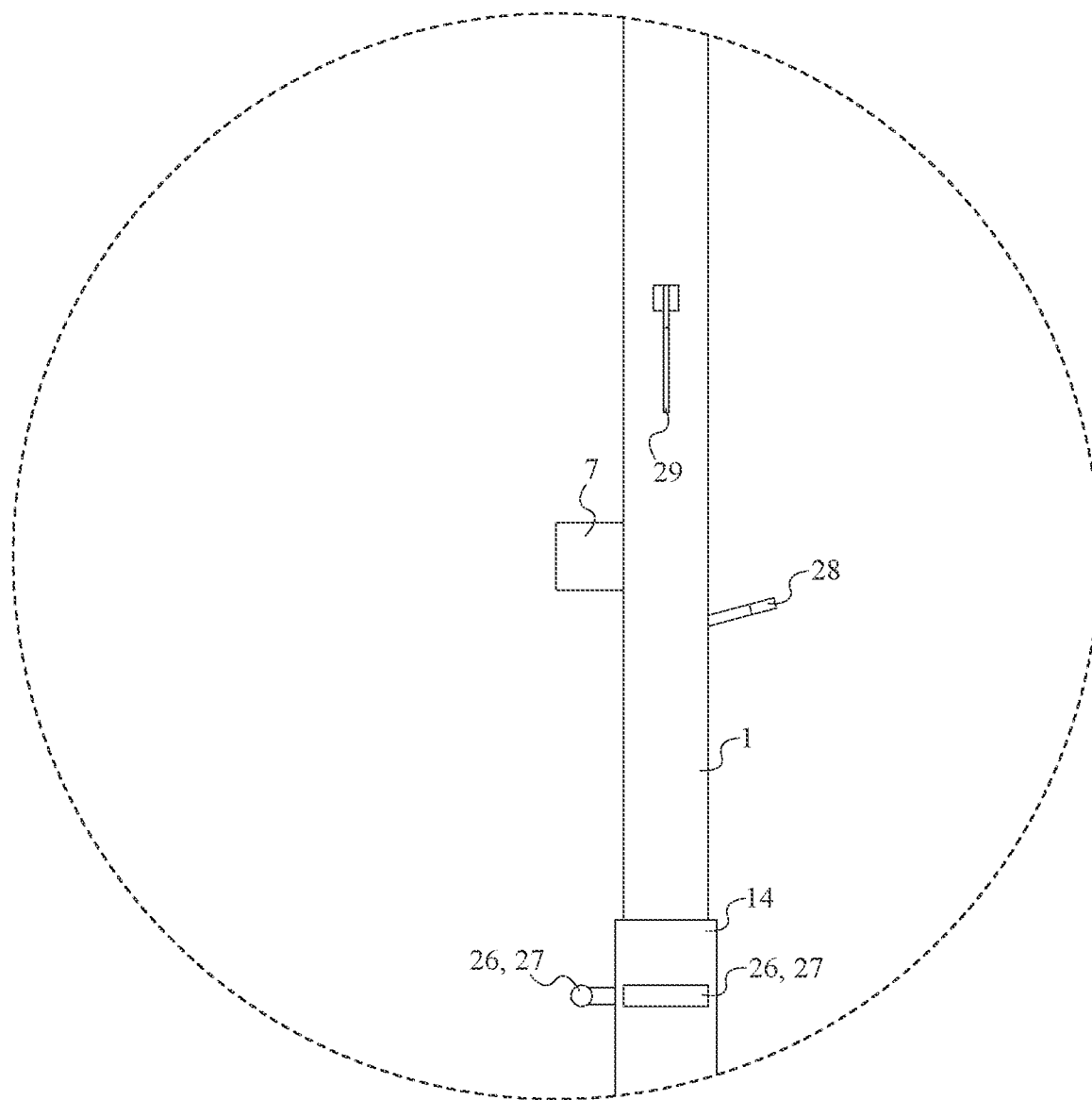
FIG. 14 is a detailed view taken about circle 14 in FIG. 12.

In order to allow a water cannon to be mounted to the present invention and with reference to FIGS. 10 and 11, the present invention may further comprise a cannon adapter 11. The cannon adapter 11 is laterally mounted to the open pipe end 5 in order to position a water cannon at an optimal position to extinguish fires. The cannon adapter 11 allows for any water cannon such as, but not limited to, a nelson F100 water connected to be mounted to the present invention. In the preferred embodiment and with reference to FIG. 13, the cannon adapter 11 comprises a pipe flange 12 and a plurality of fastener-receiving holes 13 in order to fully secure a water cannon to the present invention. The pipe flange 12 is threadably attached about the open pipe end 5 so that the pipe flange 12 can be readily attached or readily detached from the supply pipe 4 when necessary. Moreover, this arrangement allows the pipe flange 12 to establish a fluid communication between the supply pipe 4 and a water cannon. Further, each of the plurality of fastener-receiving holes 13 traverses through the pipe flange 12, and the plurality of fastener-receiving holes 13 is distributed around the pipe flange 12. This arrangement allows a water cannon to be fully secured to the present invention by a set of fasteners, which can be, but is not limited to, bolts, nuts, screws, or a combination thereof.

Figure 5:
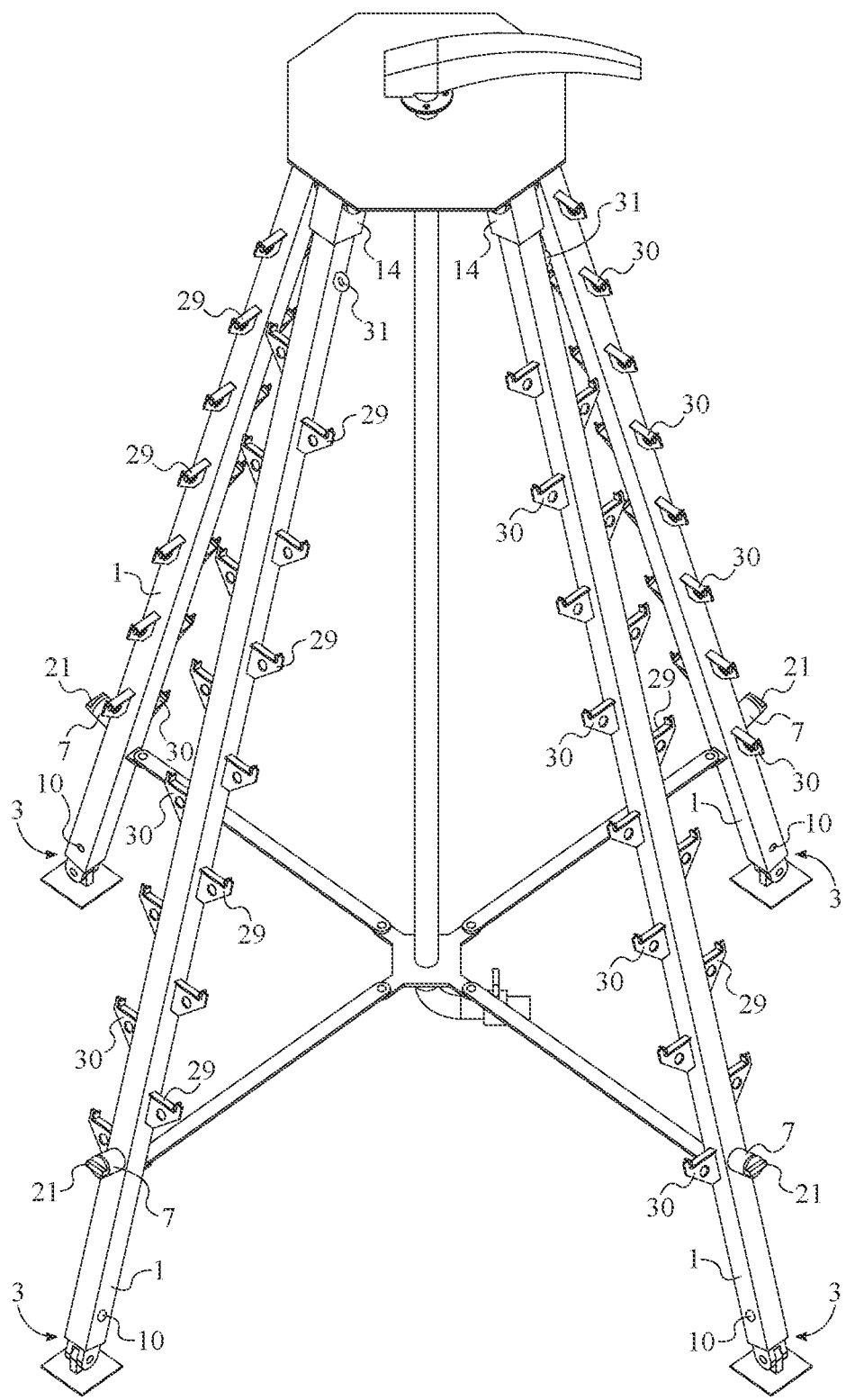
FIG. 5 is a side top perspective view of multiple of the present invention configured into a large unmanned, multiple leg firefighting tower.
Figure 6:
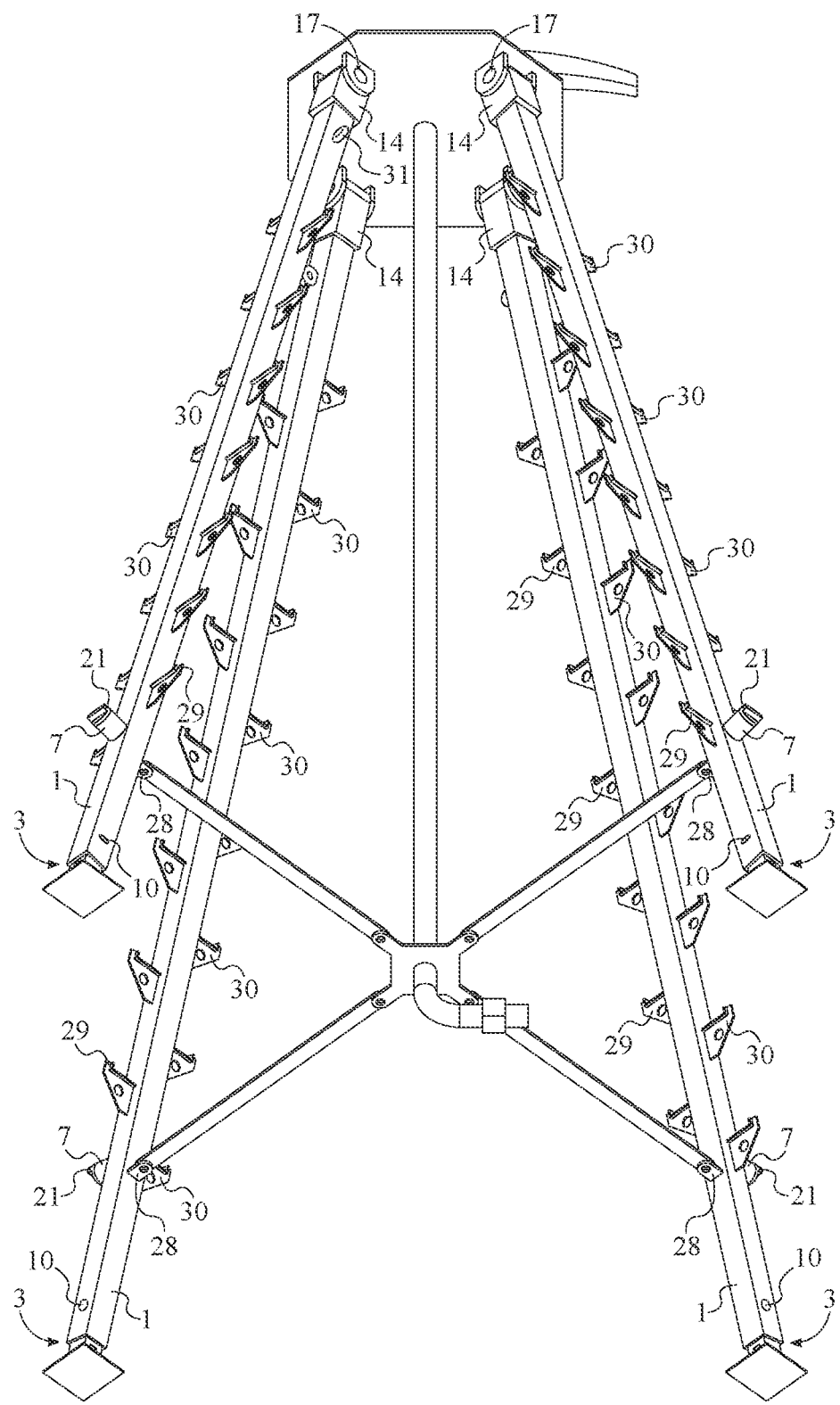
FIG. 6 is a side bottom perspective view of multiple of the present invention configured into the large unmanned, multiple leg firefighting tower.
Figure 7:
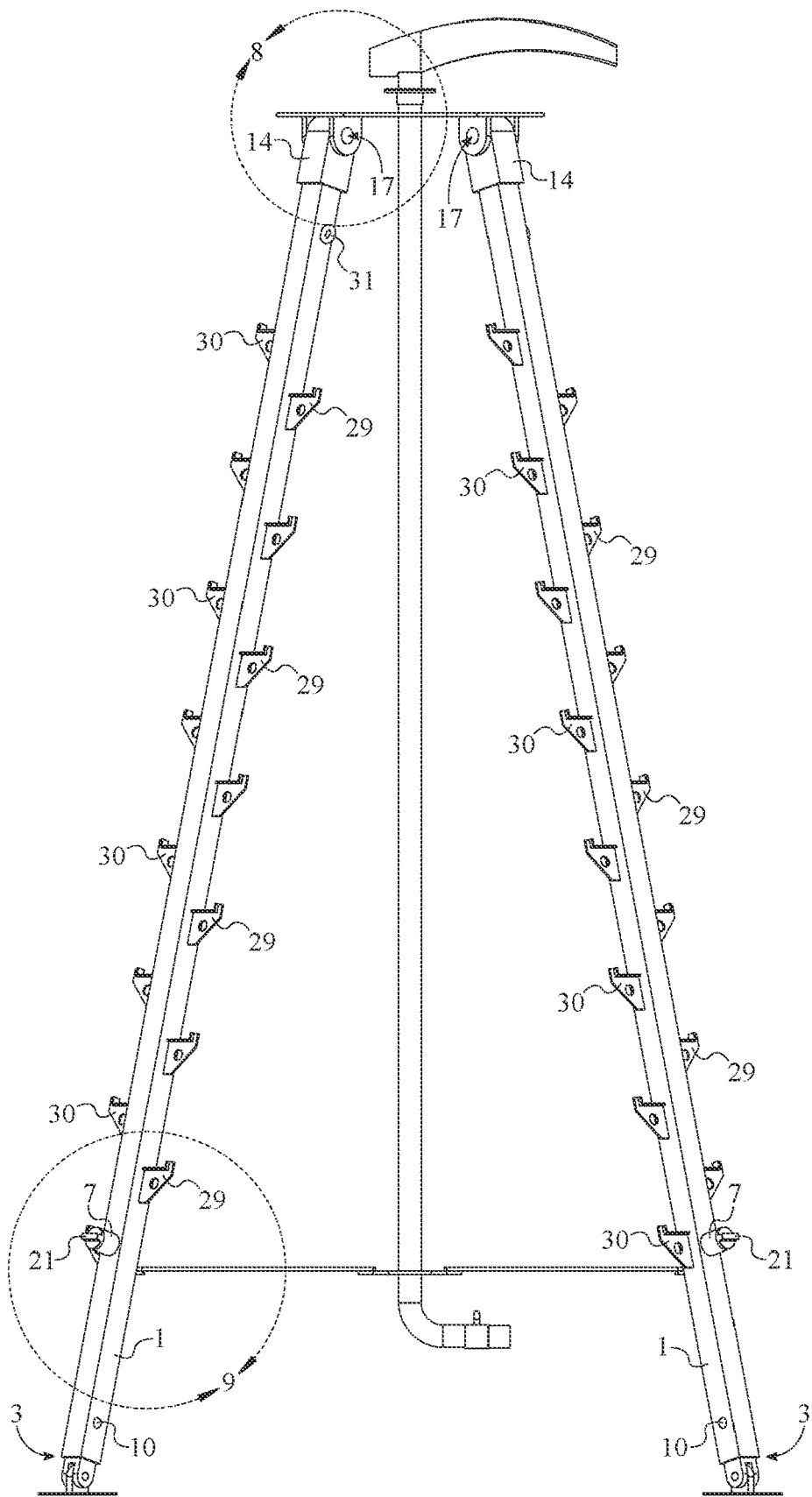
FIG. 7 is a side view of multiple of the present invention configured into the large unmanned, multiple leg firefighting tower.
Figure 8:
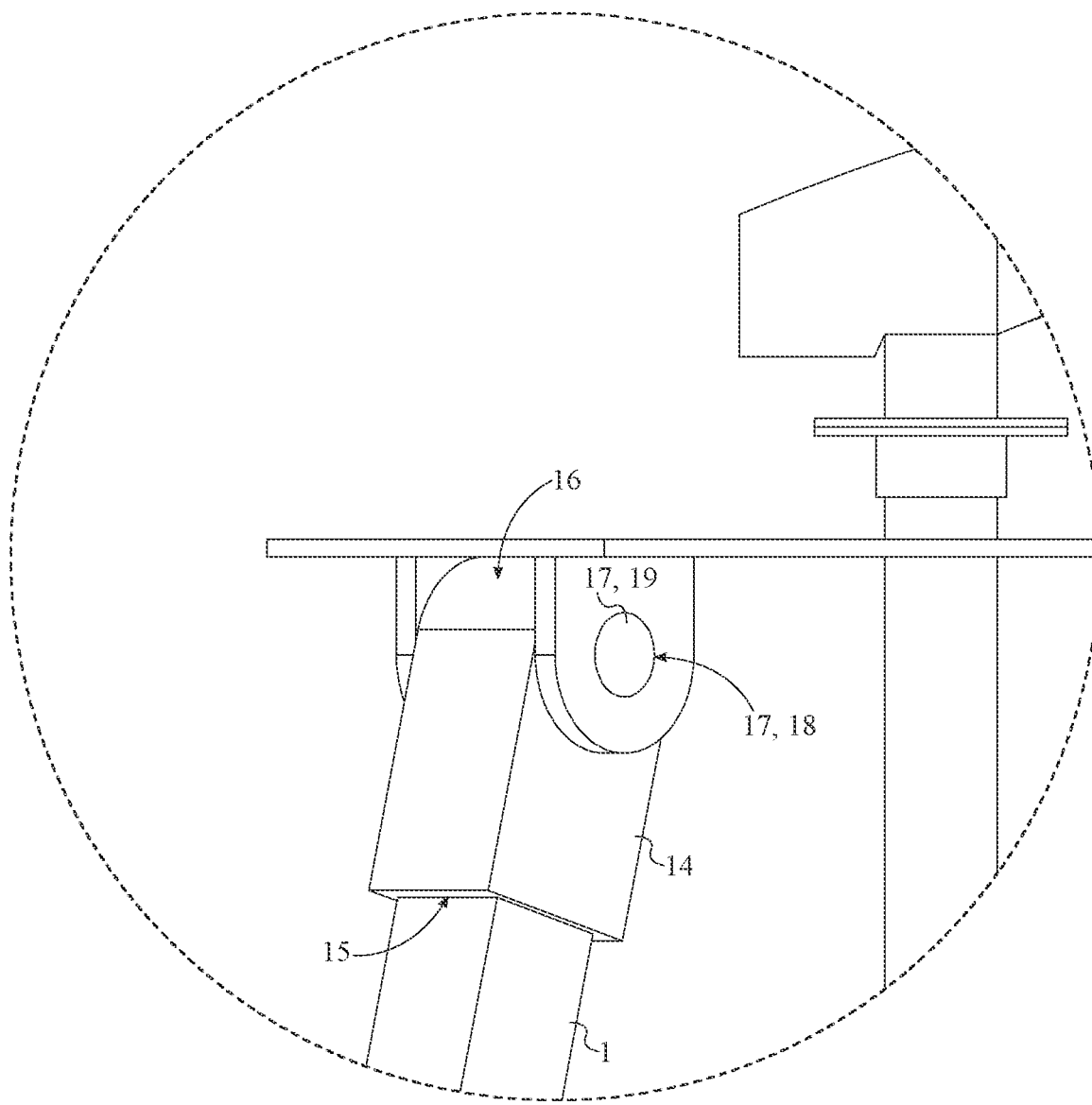
FIG. 8 is a detailed view taken about circle 8 in FIG. 7.

In order to combine the present invention with multiple of the same invention to form an unmanned, multiple leg firefighting tower and with reference to FIGS. 5 and 6, the present invention may further comprise a member sleeve 14 and a platform-attachment mechanism 17. The member sleeve 14 comprises an open sleeve end 15 and a closed sleeve end 16, which are shown in FIG. 8. The supply pipe 4 is positioned into and along the member sleeve 14 from the open sleeve end 15 in order to conceal the supply pipe 4. Further, the platform-attachment mechanism 17 is integrated into the closed sleeve end 16. Thus, the present invention can be mounted to a platform of the unmanned, multiple leg tower. In the preferred embodiment and with reference to FIG. 8, the platform-attachment mechanism 17 comprises a pinhole 18 and a pinlock 19 to pivotably mount the present invention to the platform of the unmanned, multiple leg firefighting tower. The pinhole 18 laterally traverses through member sleeve 14, adjacent to the closed sleeve end 16 in order to receive the pinlock 19. Moreover, the pinlock 19 is engaged into the pinhole 18. Thus, the pinlock 19 is secured within the pinhole 18 and can be used to pivotably mount the present invention to the platform of the unmanned, multiple leg firefighting tower.

Figure 15:
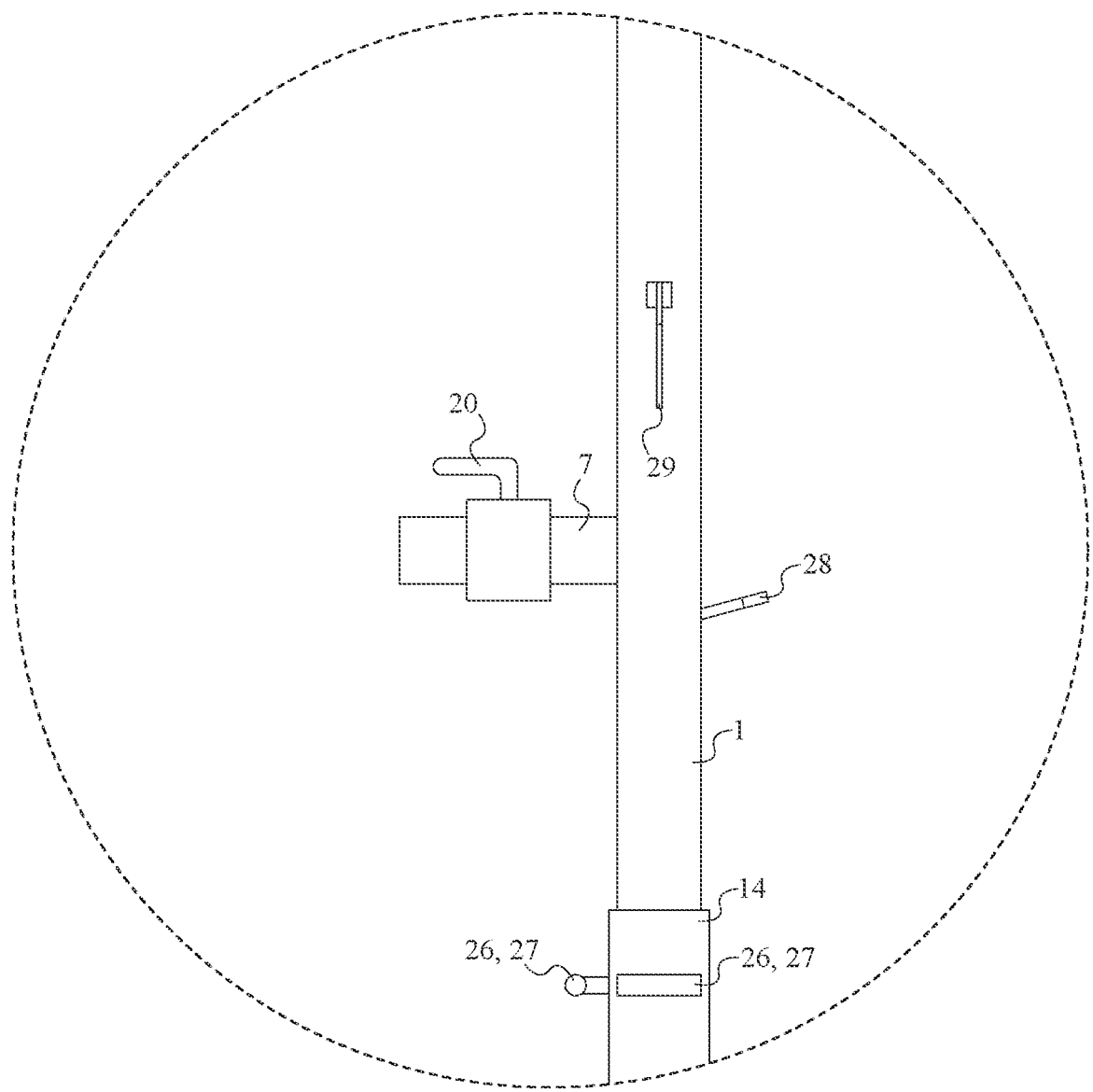
FIG. 15 is a detailed view taken about circle 15 in FIG. 12.

In order to adjust the flow of fluid coming from a water supply into the supply pipe 4 and with reference to FIG. 15, the present invention may further comprise an inlet valve 20. The inlet valve 20 is positioned external to the support member 1 in order to allow a user to easily access the inlet valve 20. Further, the inlet valve 20 is integrated into the pipe inlet 7. Thus, a user can adjust the flow of fluid entering the supply pipe 4 from a water supply.

Figure 9:
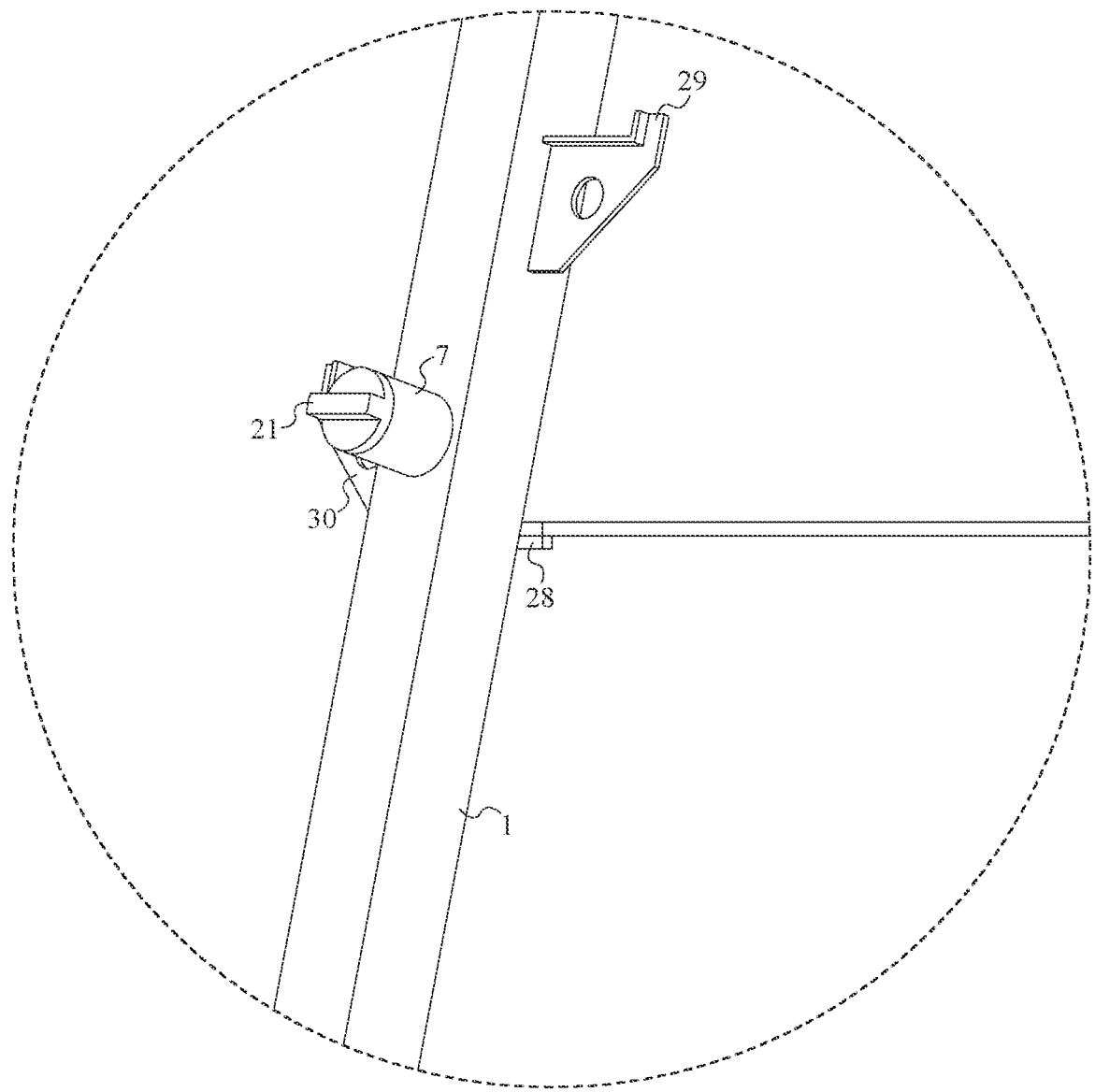
FIG. 9 is a detailed view taken about circle 9 in FIG. 7.

In order to close off the pipe inlet 7 and with reference to FIG. 9, the present invention may further comprise an inlet cap 21. The inlet cap 21 is positioned external to the support member 1 and is hermetically attached to the pipe inlet 7. Thus, the inlet cap 21 can close off the pipe inlet 7 when the present invention is combined with multiple of the same invention to form an unmanned, multiple leg firefighting tower.

Figure 16:
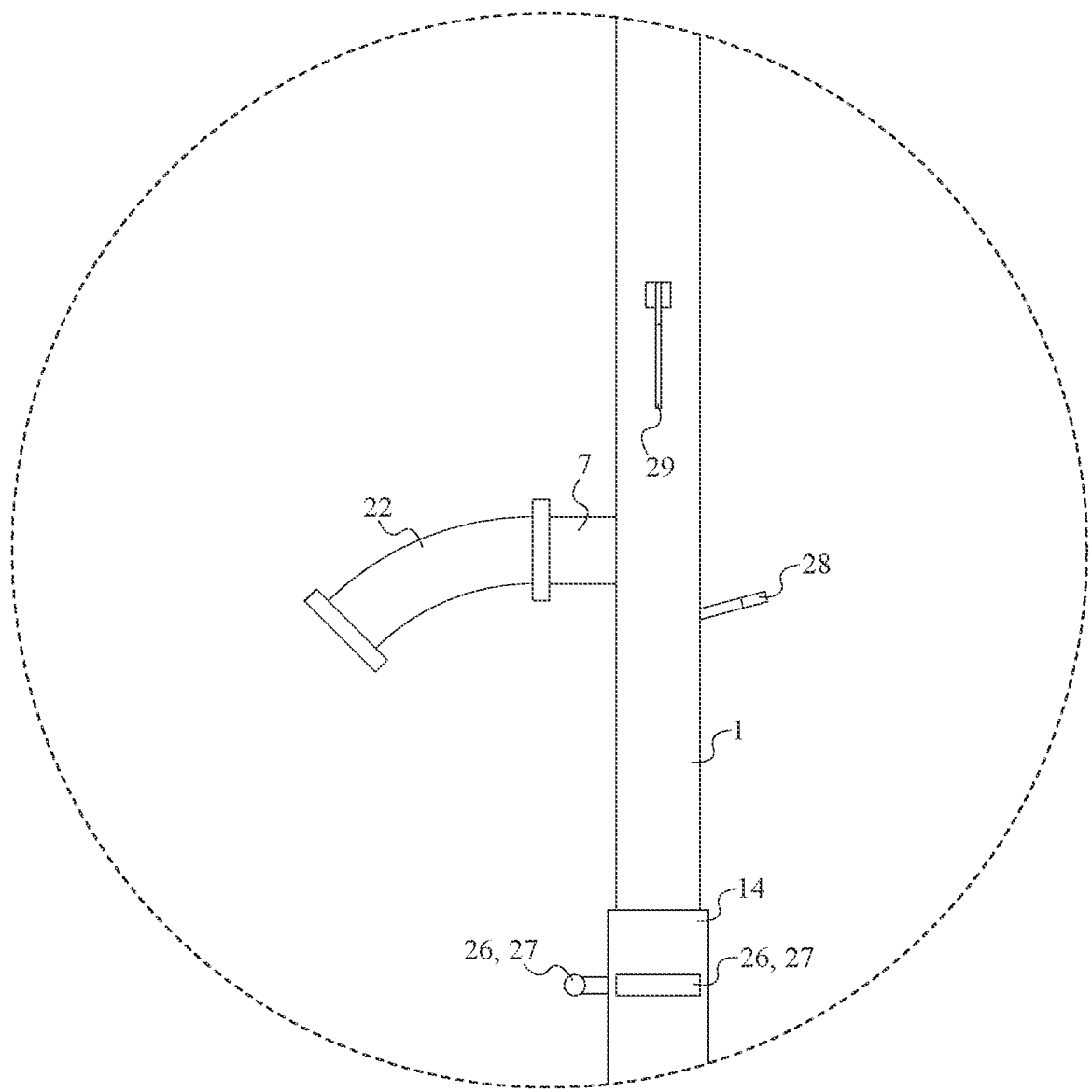
FIG. 16 is a detailed view taken about circle 16 in FIG. 12.

In order for a user to attach a water supply hose or pipe more efficiently and easily with the pipe inlet 7 with reference to FIG. 16, the present invention may further comprise at least one directional pipe fitting 22. The at least one directional pipe fitting 22 is positioned external to the support member 1 in order to be easily accessed by a user. Further, the at least one directional pipe fitting 22 is in fluid communication with the pipe inlet 7. Thus, the at least one directional pipe fitting 22 allows a user to attach a water supply hose or pipe more efficiently and easily to the pipe inlet 7.

As can be seen in FIGS. 10 and 11, in order to configure the present invention as an unmanned, single leg firefighting tower that is mounted into a ground surface, the present invention may further comprise an anchoring plate 23, an anchoring post 24, a support-receiving tube 25, and a support-securing mechanism 26. The anchoring post 24 and the support-receiving tube 25 are positioned normal to the anchoring plate 23 in order to evenly distribute the weight along the present invention. The support-receiving tube 25 is connected adjacent to the anchoring plate 23, and the lower member end 3 is attached into the support-receiving tube 25 by the support-securing mechanism 26. This arrangement fully secures the support member 1 to the anchoring plate 23. Further, the anchoring post 24 is connected adjacent to the anchoring plate 23, opposite the support-receiving tube 25. This arrangement positions anchoring post 24 to be mounted into a ground surface in order to fully stabilize the present invention when in operation. In the preferred embodiment and with reference to FIG. 14, the support-securing mechanism 26 comprises at least one clamp 27 in order to fully secure the support member 1 within the support-receiving tube 25. The at least one clamp 27 is laterally integrated into the support-receiving tube 25, and the lower member end 3 is pressed against the support-receiving tube 25 by the at least one clamp 27. Thus, this arrangement fully secures the support member 1 within the support-receiving tube 25.

In order for the leg-engagement feature 8 to effectively receive an extension leg and with reference to FIG. 2, the leg-engagement feature 8 may comprise a leg-receiving cavity 9. The leg-receiving cavity 9 traverses into and along the support member 1 from the lower member end 3. Thus, the extension leg can be inserted within the support member 1 through the leg-receiving cavity 9. Moreover and with reference to FIG. 5, the leg-engagement feature 8 may further comprise a leg fastener 10 in order to fully secure the extension leg within the support member 1. The leg fastener 10 is integrated through the leg-receiving cavity 9. For example, the leg fastener 10 may be a bolt, washer, and nut assembly that is mounted to the leg-receiving cavity 9 in order to mount the extension leg within the support member 1.

In order to stabilize the present invention when combined with multiple of the same invention and with reference to FIGS. 6 and 9, the present invention may further comprise stabilizer-attachment feature 28. The stabilizer-attachment feature 28 is laterally connected to the support member 1, offset from the upper member end 2 in order to be easily accessed by a user. In the preferred embodiment, the stabilizer-attachment feature 28 can be a nub with a fastener hole which allows a stabilizing arm to be attached to the support member 1. This stabilizing arm can then be attached to stabilizing plate that is a hub for multiple of same invention when the unmanned, multiple leg firefighting tower is formed.

In order for a user to climb the present invention in order to mount a water cannon and with reference to FIGS. 1 and 2, the present invention may further comprise a plurality of first steps 29 and a plurality of second steps 30. The plurality of first steps 29 is laterally connected along the support member 1, and the plurality of second steps 30 is laterally connected along the support member 1, opposite the plurality of first steps 29. Thus, this arrangement forms a ladder-type mechanism with the plurality of first steps 29 and the plurality of second steps 30 to allow a user to climb the present invention. Additionally, for when a user climbs the present invention, a rope or similar line of material can be tethered to at least one safety-line eyelet 31. The at least one safety-line eyelet 31 is laterally connected to the support member 1, adjacent to the upper member end 2 in order be easily accessed by the user after the user has climbed the present invention. Once a rope or similar line of material is tethered to the at least one safety-line eyelet 31, the user can safely climb then descend by rappelling down the present invention after installing or removing a water cannon.

Although the invention has been explained in relation to its preferred embodiment, it is to be understood that many other possible modifications and variations can be made without departing from the spirit and scope of the invention as hereinafter claimed.

What is claimed is:

1. A configurable support for an autonomous firefighting tower comprising:
   a support member;
   a supply pipe;
   a pipe inlet;
   a leg-engagement feature;
   the support member comprising an upper member end and a lower member end;
   the supply pipe comprising an open pipe end and an enclosed pipe end enclosed within the support member;
   the leg-engagement feature being integrated into the support member, adjacent to the lower member end;
   the supply pipe traversing into and along the support member;
   the open pipe end being positioned external to the support member, offset the upper member end;
   the closed pipe end being positioned adjacent to the leg-engagement feature;
   the leg-engagement feature comprising a leg-receiving cavity and a leg fastener;
   the leg-receiving cavity traversing into and along the support member from the lower member end;
   the leg fastener being integrated through the leg-receiving cavity;
   the pipe inlet laterally traversing into the support member;
   the pipe inlet being positioned adjacent to the leg-engagement feature, offset from the lower member end; and
   the pipe inlet being in fluid communication with the supply pipe.

2. The configurable support for an autonomous firefighting tower as claimed in claim 1 comprising:
   a cannon adapter; and
   the cannon adapter being laterally mounted to the open pipe end.

3. The configurable support for an autonomous firefighting tower as claimed in claim 2 comprising:
   the cannon adapter comprising a pipe flange and a plurality of fastener-receiving holes;
   the pipe flange being threadably attached about the open pipe end;
   each of the plurality of fastener-receiving holes traversing through the pipe flange; and
   the plurality of fastener-receiving holes being distributed around the pipe flange.

4. The configurable support for an autonomous firefighting tower as claimed in claim 1 comprising:
   a member sleeve;
   a platform-attachment mechanism;
   the member sleeve comprising an open sleeve end and a closed sleeve end;
   the supply pipe being positioned into and along the member sleeve from the open sleeve end; and
   the platform-attachment mechanism being integrated into the closed sleeve end.

5. The configurable support for an autonomous firefighting tower as claimed in claim 4 comprising:
   the platform-attachment mechanism comprising a pinhole and a pinlock;
   the pinhole laterally traversing through the member sleeve, adjacent to the closed sleeve end; and
   the pinlock being engaged into the pinhole.

6. The configurable support for an autonomous firefighting tower as claimed in claim 1 comprising:
   an inlet valve;
   the inlet valve being positioned external to the support member; and
   the inlet valve being integrated into the pipe inlet.

7. The configurable support for an autonomous firefighting tower as claimed in claim 1 comprising:
   an inlet cap;
   the inlet cap being positioned external to the support member; and
   the inlet cap being hermetically attached to the pipe inlet.

8. The configurable support for an autonomous firefighting tower as claimed in claim 1 comprising:
   at least one directional pipe fitting;
   the at least one directional pipe fitting being positioned external to the support member; and
   the at least one direction pipe fitting being in fluid communication with the pipe inlet.

9. The configurable support for an autonomous firefighting tower as claimed in claim 1 comprising:
   an anchoring plate;
   an anchoring post;
   a support-receiving tube;
   a support-securing mechanism;
   the anchoring post and the support-receiving tube being positioned normal to the anchoring plate;
   the support-receiving tube being connected adjacent to the anchoring plate,
   the anchoring post being connected adjacent to the anchoring plate, opposite the support-receiving tube; and
   the lower member end being attached into the support-receiving tube by the support-securing mechanism.

10. The configurable support for an autonomous firefighting tower as claimed in claim 9 comprising:
    the support-securing mechanism comprising at least one clamp;
    the at least one clamp being laterally integrated into the support-receiving tube; and
    the lower member end being pressed against the support-receiving tube by the at least one clamp.

11. The configurable support for an autonomous firefighting tower as claimed in claim 1 comprising:
    a stabilizer-attachment feature; and
    the stabilizer-attachment feature being laterally connected to the support member, offset from the upper member end.

12. The configurable support for an autonomous firefighting tower as claimed in claim 1 comprising:
    a plurality of first steps;
    a plurality of second steps;
    the plurality of first steps being laterally connected along the support member; and the plurality of second steps being laterally connected along the support member, opposite the plurality of first steps.

13. The configurable support for an autonomous firefighting tower as claimed in claim 1 comprising:
    at least one safety-line eyelet; and
    the at least one safety-line eyelet being laterally connected to the support member, adjacent to the upper member end.

\* \* \* \* \*